July 14, 1931.   S. B. HASELTINE   1,814,035
ANTIFRICTION BEARING
Filed Nov. 19, 1924

Witness
Wm. Geiger

Inventor
Stacy B. Haseltine
By George I. Haight
His Atty.

Patented July 14, 1931

1,814,035

UNITED STATES PATENT OFFICE

STACY B. HASELTINE, OF CHICAGO, ILLINOIS, ASSIGNOR, BY MESNE ASSIGNMENTS, TO W. H. MINER, INC., A CORPORATION OF DELAWARE

ANTIFRICTION BEARING

Application filed November 19, 1924. Serial No. 750,757.

This invention relates to improvements in anti-friction bearings.

One object of the invention is to provide a simple, practical and relatively inexpensive roller bearing, especially adapted for railway car side bearings, in which the parts are so arranged that the anti-friction element is automatically returned to normal central position under the influence of gravity when free from load.

Another object of the invention is to provide a side bearing of this character including a mounting adapted to be applied to the truck bolster of a car, upon which an anti-friction element has limited rolling engagement, with independent continuous bearing surfaces extending beyond the limits of the rolling engagement of the anti-friction element, upon which supporting means associated with said anti-friction element are arranged to travel, whereby said element is supported for rotation about its axis, when the same has passed beyond the limits of its rolling engagement; together with means for returning the element and the supporting means to normal centered position.

A further object of the invention is to provide counterweights for returning the anti-friction element to centered position which operate independently.

A still further object of the invention is to provide an anti-friction bearing of this character wherein the parts are so arranged that during the movement of the anti-friction element beyond the limits of its rolling bearing contact, and into position to be supported for rotation about its axis, there is no elevation of such element, and in which the maintenance of the element in position for rotation about its axis is not dependent upon the climbing action of the trunnions of the element upon inclined bearing seats, as heretofore has been the practice, but merely dependent upon the proximity of the opposed bolsters of the car.

Other and further objects of the invention will more clearly and fully appear from the description and claims hereinafter following.

Figure 1:
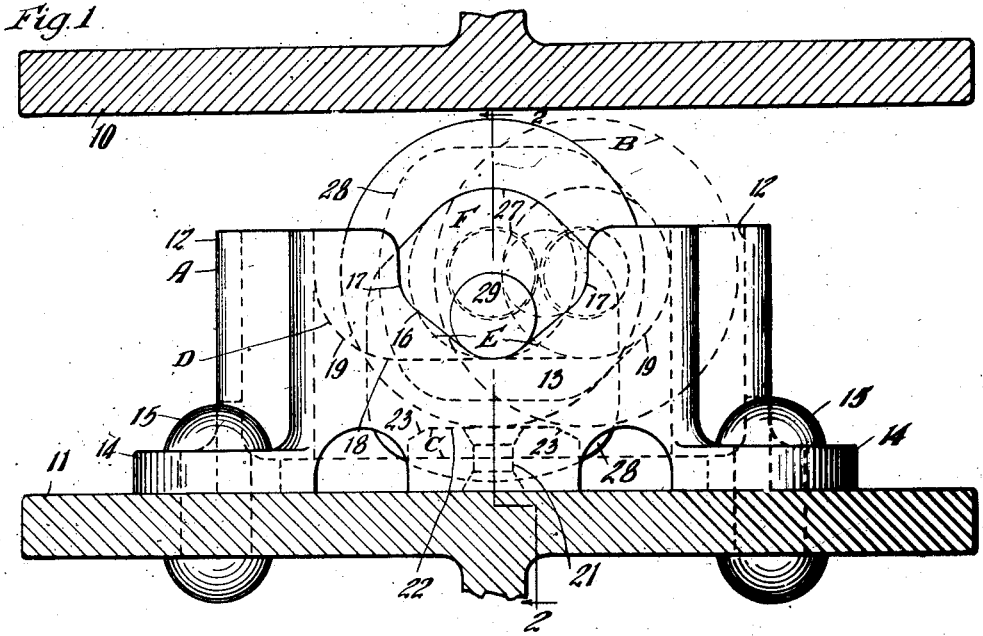
Figure 2:
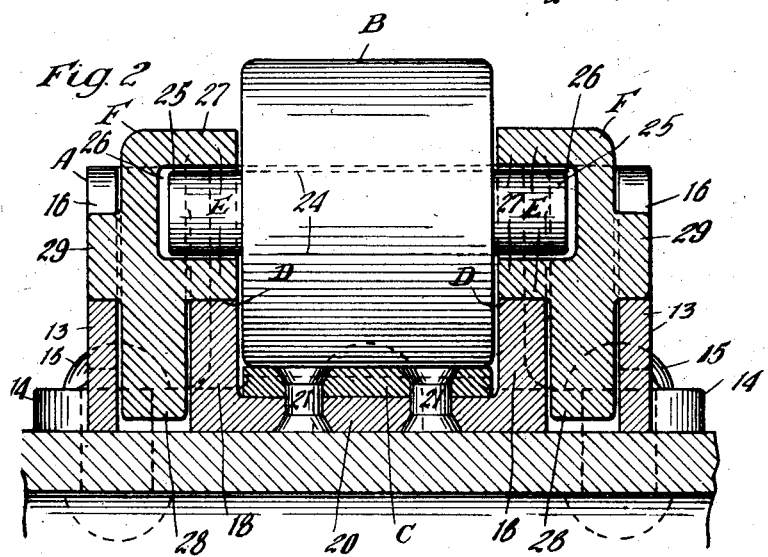

In the drawings forming a part of this specification, Figure 1 is a vertical sectional view taken through the ends of the body and truck bolsters of a railway car, showing my invention in connection therewith. And Fig. 2 is a sectional view of the invention substantially on the line 2—2 of Fig. 1.

Referring more particularly to the drawings, 10 indicates the underside of the body bolster of a railway car, and 11 the corresponding opposed truck bolster of such car. The improved side bearing is shown as applied to the truck bolster, and comprises broadly a housing A; an anti-friction element B; a central bearing plate C, upon which the anti-friction element B is adapted to roll; continuous bearing seats D extending beyond the ends of the bearing plate C; and supporting members E adapted for rolling movement upon the bearing seats D, which supporting means are suitably connected to the element B; and counterweights F forming part of such supporting means.

The housing A is provided with preferably vertical end walls 12, offset side walls 13, and flanges 14 adapted to be secured to the bolster 11 by means of suitable rivets 15. The top edges of the side walls 13 are cut out to provide substantially central V-shaped guides 16, the outer portions of such guides having arcuate stops 17, for a purpose which will be presently described. Such housing is also provided with inner side walls 18 spaced from the outer walls 13, and of less height than the top edges of the outer walls 13, and preferably of the same height as the bottom of the V-shaped cut out portions 16 provided in the walls 13.

The top edges of the walls 18 provide the horizontally disposed continuous bearing surfaces D, the ends of which are upwardly curved, as shown at 19, and merge with the offset walls 13 of the housing. The inner walls 18 are connected by the bottom portion 20, as best shown in Fig. 2, and secured to said bottom portion by the rivets 21 is the bearing plate C. The bearing plate C is centrally disposed, having a flat top surface 22, and inclined ends 23, the ends of such bearing plate terminating a substantial distance from the end walls 12 of the housing A, and also from the ends of the continuous bearing seats D formed by the inner walls 18.

An anti-friction element B is disposed in said housing, and adapted for rolling engagement during a portion of its movement upon the bearing plate C. Such anti-friction element preferably has disposed axially therein a shaft 24 providing the trunnions 25—25, adapted for disposition in sockets 26—26 formed in the supporting members E. The supporting members E comprise annular portions 27 surrounding the sockets 26, the outer periphery of each annular portion 27 being adapted for rolling engagement upon the related bearing surface D. Extensions 28 are provided upon the supporting members E, which extensions provide counter-weights which swing freely between the spaced walls 13 and 18 of the housing, the outer sides of the counterweights being provided with bosses 29—29 which operate within the V-shaped cut out portions 16, as clearly illustrated in the drawings.

The operation of the device is as follows, assuming that the anti-friction element and the related parts are moving toward the right as shown in dotted lines in Fig. 1. During the initial movement of the anti-friction element, the same rolls upon the bearing plate C, and during this movement the supporting members E roll upon the bearing surfaces D, which causes a clockwise movement of the counterweight extensions 28, and a movement of the bosses 29—29 along the edges of the cut out portions 16. Upon continued movement of the anti-friction element B, the same arrives at the point where it leaves the bearing plate C, at which time it will be supported through the medium of its trunnions upon the supporting members E for unlimited rotation, the counterweight extensions 28 during this movement being swung through a greater arc until the supporting members come into contact with the curved end walls 19 of the bearing surfaces D. During this movement the bosses 29—29 due to the eccentric mounting with reference to the element B, will have traveled to position to engage the curved seats 17. The anti-friction element B is then prevented from further bodily movement, and rotates freely upon its axis. When the load is removed from the anti-friction element B, the counterweights acting upon the supporting elements E cause the same to roll toward centered position, this movement in turn being communicated to the anti-friction element B, and continued until the bosses are again disposed at the bottoms of the V-shaped guides 16, which assures the return of the parts to original centered position.

It should be particularly observed that the movement of the anti-friction element is transmitted to the counterweights resulting in their vertical displacement, and it is also apparent that the continuous bearing surfaces D and the supporting members E serve to smoothly and efficiently transfer the anti-friction element from rolling engagement with the bearing plate into position to rotate about its axis, without elevation of such element, and when the load is removed from the same, the counterweights urge all the parts toward centered position, the bosses 29—29 operating to assure the exact centering thereof when returned by the counterweights.

Attention is also called to the fact that by reason of the rolling engagement of the supporting members E, carrying the counter-weights, with the bearing surfaces D, and the loose connection of the members E with the element B, the position of the member E with respect to the surfaces D is determined by the position of the element B, and this is true regardless of whether the element B is rolled or bodily slid to either side of centered position, so that the counter-weights operate to return the element B to centered position at all times.

While I have herein shown and described the preferred manner of carrying out my invention, the same is merely illustrative, and I contemplate all changes and modifications that come within the scope of the claims appended hereto.

I claim:

1. In an anti-friction bearing, the combination with a mounting adapted to be secured to the truck bolster of a vehicle; of an anti-friction element adapted to have limited bearing contact with respect to said mounting; means associated with said mounting providing independent bearing surfaces; supporting means movable with said element and adapted to have rolling engagement with said bearing surfaces and operating to support said anti-friction element for rotation about its axis beyond the limits of its said bearing contact; and centering means secured to said supporting means, in the form of counter-weights which in normal balanced condition are disposed centrally with reference to said mounting, said counter-weights being unbalanced dependent upon rolling movement of said supporting means.

2. In an anti-friction bearing, the combination with a mounting adapted to be secured to the truck bolster of a vehicle; of an anti-friction element adapted to have a certain limited bearing movement with respect to said mounting; means associated with said mounting providing independent bearing surfaces; supporting means associated with said element and adapted to have rolling engagement with said bearing surfaces and operating to support said anti-friction element for rotation about its axis beyond said limited bearing movement;

counter-weights associated with said supporting means; and means for centering said counter-weights.

3. In an anti-friction bearing, the combination with a mounting adapted to be secured to the truck bolster of a vehicle; a bearing plate terminating short of the ends of said mounting; independent, continuous bearing surfaces associated with said mounting and extending beyond the ends of said bearing plate; an anti-friction roller adapted to have rolling engagement with said bearing plate, and provided with trunnions; supporting members connected with said trunnions and adapted to roll on said independent bearing surfaces; and counterweights connected with said supporting member.

4. In an anti-friction bearing, the combination with a retainer adapted to be secured to the truck bolster of a vehicle and having a bearing member; of an anti-friction element arranged to have rolling engagement of its tread with said mounting for a limited distance to either side of central position; additional bearing means independent of said first bearing member and disposed to provide bearing surfaces at either side of central position with reference to said retainer beyond the limits of rolling engagement of said anti-friction element with said bearing surface; supporting means rotatably connected at a central point with reference to said element, said supporting means being engageable with said additional bearing surfaces to support said anti-friction element for rotation about its central axis when said element is moved to either side of central position out of rolling engagement with said bearing member, said supporting means having connected therewith eccentric weighted portions; and means for displacing said weighted portions of said supporting means when the latter are moved to either side of central position whereby said weighted portions return the supporting means to central position when the anti-friction element is free from load.

5. In an anti-friction bearing, the combination with a mounting adapted to be secured to the truck bolster of a vehicle, said mounting being provided with a bearing surface terminating short of the ends thereof; of an anti-friction element arranged to have limited rolling engagement with said bearing surface; means associated with said mounting providing continuous bearing surfaces extending substantially parallel to said first named bearing surface and having portions extending beyond the ends of the latter; supporting means having annular surfaces adapted to roll continuously upon said continuous bearing surface, said supporting means having a central rotatable connection with said anti-friction element whereby said supporting means when moved beyond the ends of said first named bearing surface supports said element for rotation about its central axis; and means for centering said supporting means with reference to said mounting and maintaining the same in central position when the anti-friction element is free from load, said means being in the form of eccentric weights connected to said supporting means.

6. In an anti-friction bearing, the combination with a bearing member provided with spaced vertical walls and a connecting portion at the bottom of said walls, the free edges of said vertical walls providing continuous bearing surfaces; a bearing plate secured to said connecting portion between said walls and having a bearing surface terminating short of the ends of the bearing surfaces on the edges of said walls; an anti-friction roller disposed normally in rolling contact with said bearing plate; supporting means connected to said roller and engaging said continuous bearing surfaces and adapted to support said roller for rotation about its central axis when said roller is moved beyond rolling engagement with said bearing plate; a retainer in which said bearing member is mounted; and means interposed between the walls of said retainer and the vertical walls of said bearing member, said means co-operating with said supporting means to center the latter and said roller.

7. In a structure of the character described, the combination with a retainer having side and end walls, said side walls being provided with V-shaped notches; a bearing plate in the bottom of said retainer terminating short of the end walls thereof; independent bearing surfaces in said retainer extending beyond the ends of said bearing plate; a roller normally disposed in rolling engagement with said bearing, said roller plate being provided with trunnions; supporting members having annular portions in rolling engagement with said independent bearing surfaces and provided with central openings for the reception of the trunnions on said roller, said supporting means being provided with eccentric weighted portions, and with projections adapted for engagement with the V-shaped notches in said side walls.

8. In an anti-friction bearing, the combination with a mounting adapted to be secured to a bolster and having a bearing surface of limited extent; of an anti-friction roller arranged to roll on said surface and adapted to pass off beyond said surface; supporting devices having journaled connection with said roller and movable with the roller upon bodily movement of the latter; means on said mounting for supporting said devices when the roller has passed off of said bearing surface, whereby the roller is adapted to freely rotate with respect to said devices; and means operatively interposed between said devices and mounting, arranged to be placed in a condition of unstable equilibrium when the roller is bodily moved from central position, whereby, when the roller is relieved of load, said devices are automatically restored to normal position together with the roller.

In witness that I claim the foregoing I have hereunto subscribed my name this 15th day of November 1924.

STACY B. HASELTINE.

CERTIFICATE OF CORRECTION.

Patent No. 1,814,035. Granted July 14, 1931, to

STACY B. HASELTINE.

It is hereby certified that error appears in the printed specification of the above numbered patent requiring correction as follows: Page 3, line 108, claim 7, strike out the word "plate; and that the said Letters Patent should be read with this correction therein that the same may conform to the record of the case in the Patent Office.

Signed and sealed this 29th day of September, A. D. 1931.

(Seal)

M. J. Moore,
Acting Commissioner of Patents.